US011907759B2

(12) United States Patent
Ma et al.

(10) Patent No.: US 11,907,759 B2
(45) Date of Patent: Feb. 20, 2024

(54) TECHNOLOGIES FOR PROVIDING PREDICTIVE THERMAL MANAGEMENT (71) Applicant: Intel Corporation, Santa Clara, CA (US)

(72) Inventors: Chungwen Ma, Taipei (TW); Shuling Chiu, Taipei (TW)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 17/352,141

(22) Filed: Jun. 18, 2021

(65) Prior Publication Data

US 2022/0043679 A1 Feb. 10, 2022

Related U.S. Application Data

(63) Continuation of application No. 15/997,757, filed on Jun. 5, 2018, now Pat. No. 11,042,406.

(51) Int. Cl.
*G06F 9/48* (2006.01)
*G06F 11/30* (2006.01)
*G06F 11/34* (2006.01)
*G06F 9/50* (2006.01)
*G06F 1/32* (2019.01)
*G06F 1/26* (2006.01)
*G05D 23/19* (2006.01)

(52) U.S. Cl.
CPC ....... *G06F 9/4893* (2013.01); *G05D 23/1917* (2013.01); *G06F 1/26* (2013.01);
(Continued)

(58) Field of Classification Search
CPC .... G06F 9/4893; G06F 9/5027; G06F 9/5094; G06F 9/5044; G06F 9/50; G06F 9/5083;
(Continued)

(56) References Cited

U.S. PATENT DOCUMENTS 9,097,590 B2    8/2015  Johns et al.
9,176,508 B2 *  11/2015 Geissler ................ G06F 9/5094
(Continued)

FOREIGN PATENT DOCUMENTS

GB       2576032 B      4/2021
GB       2576030 B      12/2021
(Continued)

OTHER PUBLICATIONS

Notice of Allowance for U.S. Appl. No. 15/997,757, dated Feb. 18, 2021, 11 pages.

*Primary Examiner* — Ronald D Hartman, Jr.
(74) *Attorney, Agent, or Firm* — HANLEY, FLIGHT & ZIMMERMAN, LLC (57) ABSTRACT

Technologies for providing predictive thermal management include a compute device. The compute device includes a compute engine and an execution assistant device to assist the compute engine in the execution of a workload. The compute engine is configured to obtain a profile that relates a utilization factor indicative of a present amount of activity of the execution assistant device to a predicted temperature of the execution assistant device, determine, as the execution assistant device assists in the execution of the workload, a value of the utilization factor of the execution assistant device, determine, as a function of the determined value of the utilization factor and the obtained profile, the predicted temperature of the execution assistant device, determine whether the predicted temperature satisfies a predefined threshold temperature, and adjust, in response to a determination that the predicted temperature satisfies the predefined threshold temperature, an operation of the compute device to reduce the predicted temperature. Other embodiments are also described and claimed.

22 Claims, 6 Drawing Sheets

(52) U.S. Cl.
CPC ............... *G06F 1/32* (2013.01); *G06F 9/50* (2013.01); *G06F 9/505* (2013.01); *G06F 9/5027* (2013.01); *G06F 9/5044* (2013.01); *G06F 9/5083* (2013.01); *G06F 9/5094* (2013.01); *G06F 11/3024* (2013.01); *G06F 11/3409* (2013.01)

(58) Field of Classification Search
CPC .. G06F 9/505; G06F 11/3024; G06F 11/3409; G06F 1/26; G06F 1/32
See application file for complete search history.

(56) References Cited

U.S. PATENT DOCUMENTS

| | | |
|---|---|---|
| 11,042,406 B2 | 6/2021 | Ma et al. |
| 2005/0278520 A1* | 12/2005 | Hirai ............... G06F 1/329 713/1 |
| 2014/0089699 A1 | 3/2014 | O'Connor et al. |
| 2016/0014073 A1 | 1/2016 | Reddy et al. |
| 2017/0083364 A1* | 3/2017 | Zhao ............... G06F 9/5083 |
| 2017/0277564 A1* | 9/2017 | Coteus ............. G06F 9/5094 |
| 2018/0157532 A1 | 6/2018 | Kumar et al. |
| 2018/0349175 A1 | 12/2018 | Andrus et al. |
| 2019/0068693 A1 | 2/2019 | Bernat |
| 2020/0034171 A1 | 1/2020 | Kommula et al. |
| 2020/0073464 A1 | 3/2020 | Bernat et al. |
| 2021/0320050 A1 | 10/2021 | Robinson et al. |

FOREIGN PATENT DOCUMENTS

| | | | |
|---|---|---|---|
| GB | 2597525 A | 2/2022 | |
| GB | 2601357 A | 6/2022 | |
| WO | WO-2017025696 A1 * | 2/2017 | ............. G06F 1/206 |

* cited by examiner

TECHNOLOGIES FOR PROVIDING PREDICTIVE THERMAL MANAGEMENT

CROSS-REFERENCE TO RELATED APPLICATIONS

This application is a continuation of U.S. patent application Ser. No. 15/997,757, filed Jun. 5, 2018. The entire specification of which is hereby incorporated herein by reference in its entirety.

BACKGROUND

Thermal control plays an increasingly important role in compute devices in a data center. In moderns systems, many devices, referred to herein as "workload assistant devices," such as graphics processing units (GPUs), network interface controllers (NICs), or other special purpose devices, may assist in the execution of a workload that has been assigned to a compute device to perform (e.g., on behalf of a client compute device, such as a client of a cloud data center). That is, while a central processing unit (CPU) may be utilized to perform general processing operations, certain functions may be offloaded from the CPU to one or more of the workload assistant devices to expedite the processing of the workload. The CPU and the workload assistant devices produce heat as a byproduct of their operations and managing the temperature of the components of the compute device (e.g., to remain below a threshold temperature) is a significant factor in reducing wear on the components and preserving the investment made in the compute devices in the data center. However, equipping each workload assistant device in each compute device with a temperature sensor that is configured to directly measure the temperature of the corresponding workload assistant device and report the temperature to the corresponding CPU adds to the cost and complexity of each compute device in the data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
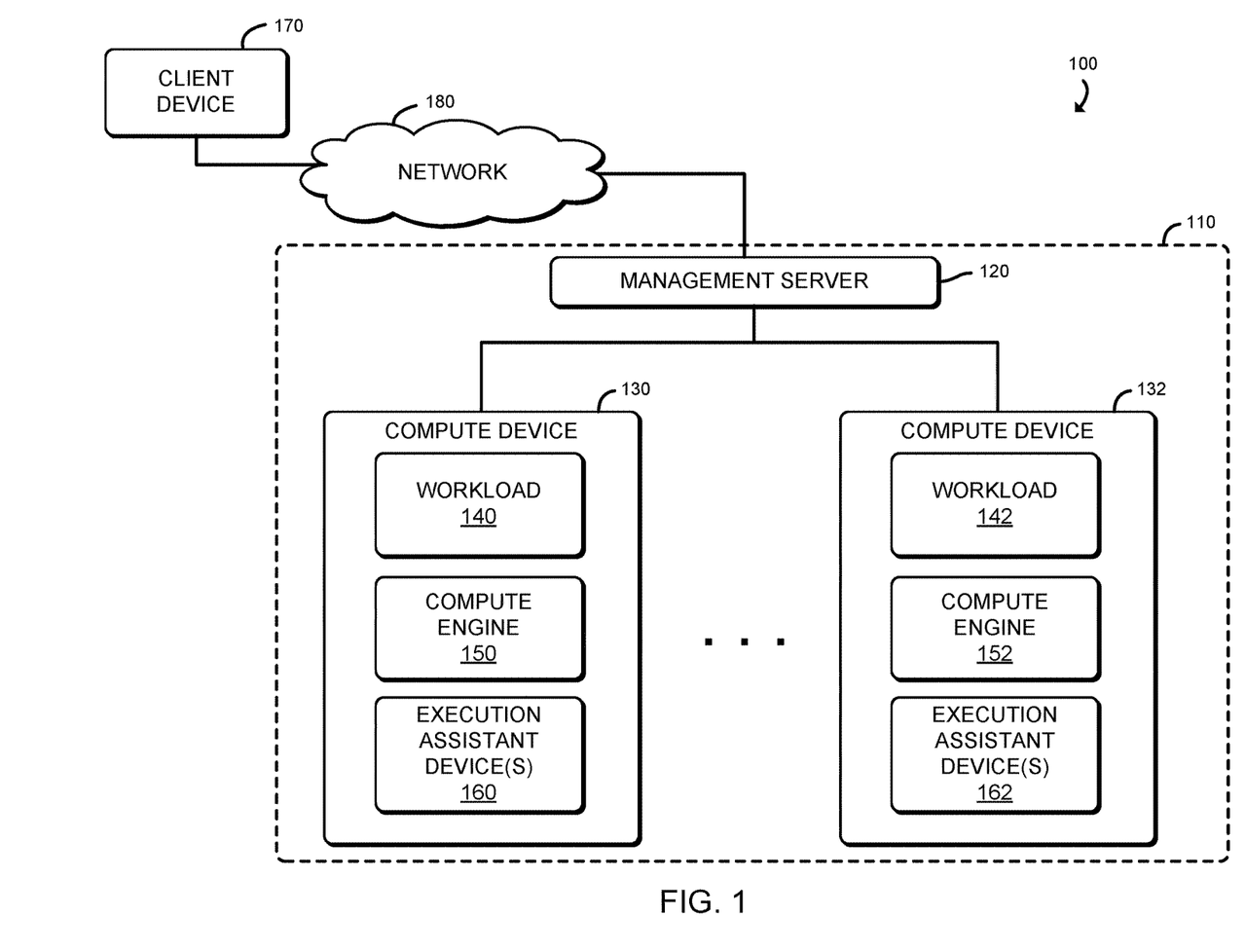
FIG. 1 is a simplified diagram of at least one embodiment of a system for providing predictive thermal management.

Referring now to FIG. 1, a system 100 for providing predictive thermal management includes a data center 110, such as a cloud data center, in which a management server 120 is in communication with a set of compute devices 130, 132 (e.g., to manage the assignment of workloads to the compute devices 130, 132). Each compute device 130, 132, in operation, may execute one or more workloads 140, 142 (e.g., applications) on behalf of a client device 170, which, in the illustrative embodiment, is in communication with the management server 120 and/or the compute devices 130, 132 through a network 180. In the illustrative embodiment, the compute devices 130, 132 execute each workload 140, 142 with a corresponding compute engine 150, 152 (e.g., a processor and memory, as described in more detail herein). In doing so, each compute engine 150, 152 may offload a portion of the processing for the workload to one or more execution assistant devices 160, 162, each of which may be embodied as any specialized device or circuitry (e.g., an accelerator device such as a graphics processing unit (GPU), a field-programmable gate array (FPGA), an application specific integrated circuit (ASIC), communication circuitry and/or a data storage device) configured to perform one or more functions to assist in the execution of a workload that has been assigned to the corresponding compute device 130, 132. A field-programmable gate array (FPGA) is an integrated circuit designed to be configured by a customer or a designer after manufacturing—hence "field-programmable". The FPGA configuration is generally specified using a hardware description language (HDL), similar to that used for an application-specific integrated circuit (ASIC). FPGAs contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and XOR. In most FPGAs, logic blocks also include memory elements, which may be simple flip-flops or more complete blocks of memory.

In the illustrative embodiment, to reduce manufacturing cost and complexity, the execution assistant devices 160, 162 do not include temperature sensors configured to report, to the corresponding compute engine 150, 152, their temperatures. As such, and as described in more detail herein, each compute device predicts (e.g., infers) the temperature of the execution assistant devices 160, 162 based on other measured metrics (e.g., number of operations performed per second, a bandwidth setting, etc.), referred to herein as utilization factors, of each execution assistant device 160, 162. In predicting the temperatures, the compute devices 130, 132, in the illustrative embodiment, reference a profile specific to the execution assistant device 160, 162 in question that defines a relationship between values of the utilization factors of the execution assistant device 160, 162 to a corresponding temperature. In response to a determination that a predicted temperature satisfies (e.g., is equal to or greater than) a predefined threshold temperature, the compute device 130, 132 performs an action (e.g., activate and/or change a speed of a fan or pump, throttle one or more of the execution assistant devices to reduce their level of activity and heat production, etc.) to reduce the temperature, thereby reducing thermal stress and prolonging the usable life of the components of the compute device without requiring the devices be equipped with temperature-reporting device (e.g., temperature sensors).

Figure 2:
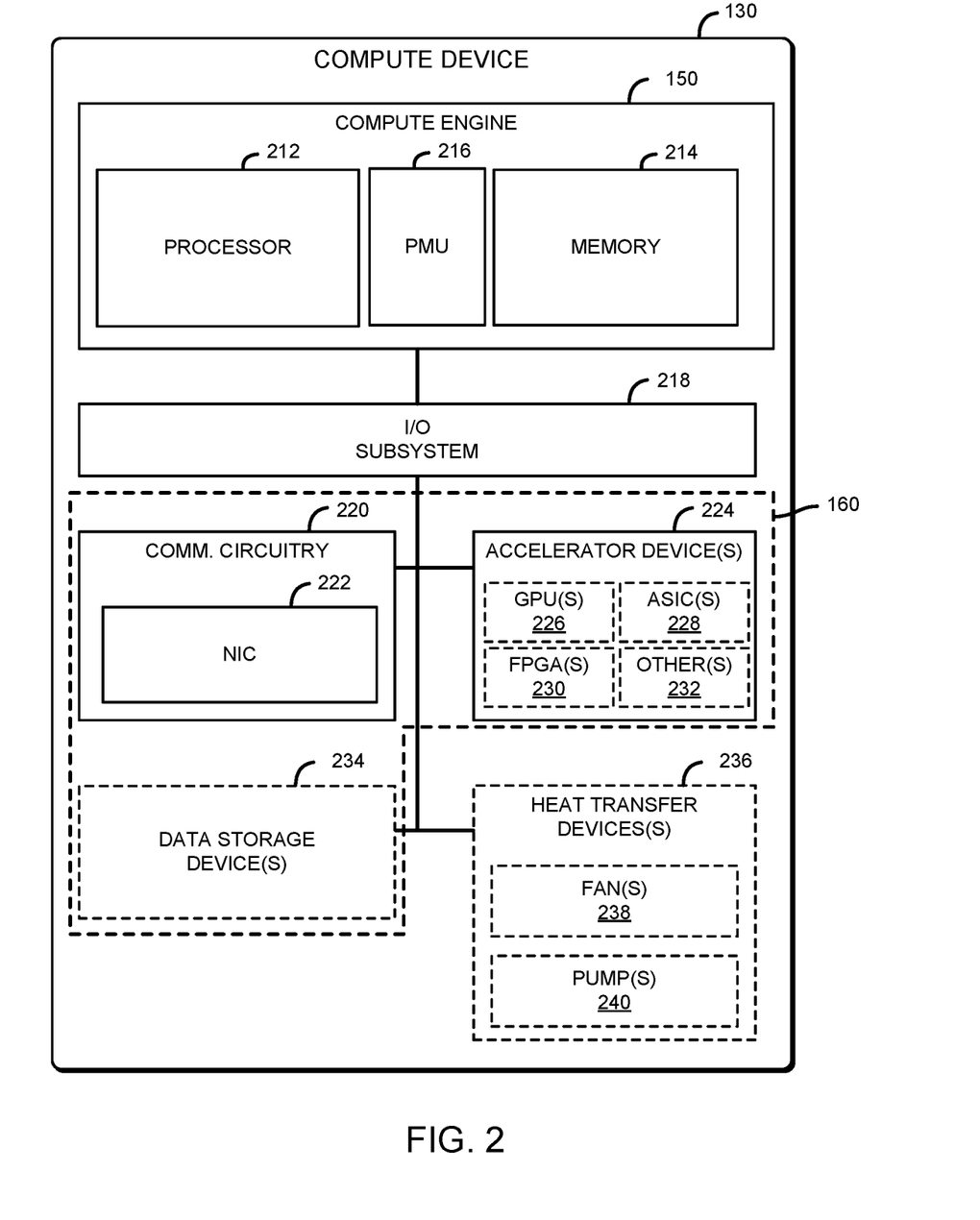
FIG. 2 is a simplified block diagram of at least one embodiment of a compute device of the system of FIG. 1.

Referring now to FIG. 2, the compute device 130 may be embodied as any type of device (e.g., a computer) capable of performing the functions described herein, including obtaining a profile that relates a utilization factor indicative of a present amount of activity of an execution assistant device to a predicted temperature of the execution assistant device, determining, as the execution assistant device assists in the execution of the workload, a value of the utilization factor of the execution assistant device, determining, as a function of the determined value of the utilization factor and the obtained profile, the predicted temperature of the execution assistant device, determining whether the predicted temperature satisfies a predefined threshold temperature, and adjusting, in response to a determination that the predicted temperature satisfies the predefined threshold temperature, an operation of the compute device to reduce the predicted temperature.

As shown in FIG. 2, the illustrative compute device 130 includes a compute engine 150, an input/output (I/O) subsystem 218, communication circuitry 220, one or more accelerator devices 224, one or more data storage devices 234, and one or more heat transfer devices 236. Of course, in other embodiments, the compute device 130 may include other or additional components, such as those commonly found in a computer (e.g., a display, peripheral devices, etc.). Additionally, in some embodiments, one or more of the illustrative components may be incorporated in, or otherwise form a portion of, another component. The compute engine 150 may be embodied as any type of device or collection of devices capable of performing various compute functions described below. In some embodiments, the compute engine 150 may be embodied as a single device such as an integrated circuit, an embedded system, a field-programmable gate array (FPGA), a system-on-a-chip (SOC), or other integrated system or device. In the illustrative embodiment, the compute engine 150 includes or is embodied as a processor 212, a memory 214, and a performance monitor unit (PMU) 216. The processor 212 may be embodied as any type of processor capable of performing a set of functions. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as applications, programs, libraries, and drivers. The PMU 216 may be embodied as any device or circuitry (e.g., an integrated circuit, a co-processor, etc.) configured to monitor values of the utilization factors (e.g., number of operations performed per second, such as a number of memory transactions per second, a number of transactions through a particular bus, such as a peripheral component interconnect express (PCIe) bus per second, a bandwidth setting, etc.) of the execution assistant devices 160 during the operation of the compute device 130 and provide the monitored values to the processor 212. In some embodiments, the PMU 216 is integrated into the processor 212.

The compute engine 150 is communicatively coupled to other components of the compute device 130 via the I/O subsystem 218, which may be embodied as circuitry and/or components to facilitate input/output operations with the compute engine 150 (e.g., with the processor 212, main memory 214, and/or the PMU 216) and other components of the compute device 130. For example, the I/O subsystem 218 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 218 may form a portion of a system-on-a-chip (SoC) and be incorporated, along with one or more of the processor 212, the main memory 214, and other components of the compute device 130, into the compute engine 150.

The communication circuitry 220 may be embodied as any communication circuit, device, or collection thereof, capable of enabling communications over the network 180 between the compute device 130 and another compute device (e.g., the management server 120, the client device 170, the compute device 132, etc.). The communication circuitry 220 may be configured to use any one or more communication technology (e.g., wired or wireless communications) and associated protocols (e.g., Ethernet, Infini-Band, Bluetooth®, Wi-Fi®, WiMAX, etc.) to effect such communication.

The illustrative communication circuitry 220 includes a network interface controller (NIC) 222, which may also be referred to as a host fabric interface (HFI). The NIC 222 may be embodied as one or more add-in-boards, daughter cards, network interface cards, controller chips, chipsets, or other devices that may be used by the compute device 130 to connect with another compute device (e.g., the management server 120, the client device 170, the compute device 132, etc.) through the network 180. In some embodiments, the NIC 222 may be embodied as part of a system-on-a-chip (SoC) that includes one or more processors, or included on a multichip package that also contains one or more processors. In some embodiments, the NIC 222 may include a local processor (not shown) and/or a local memory (not shown) that are both local to the NIC 222. In such embodiments, the local processor of the NIC 222 may be capable of performing one or more of the functions of the compute engine 150 described herein. Additionally or alternatively, in such embodiments, the local memory of the NIC 222 may be integrated into one or more components of the compute device 130 at the board level, socket level, chip level, and/or other levels.

The accelerator devices 224 may be embodied as any devices or circuitry capable of executing one or more operations of a workload (e.g., operations that have been offloaded from the compute engine 150) faster than the compute engine 150 is able to perform those operations. In the illustrative embodiment, the accelerator devices 224 may include one or more graphics processing units 226 (e.g., any device or circuitry configured to process graphics data), one or more ASICs 228, one or more FPGAs 230, and/or one or more other devices 232 (e.g., co-processors, etc.). The one or more illustrative data storage devices 234 may be embodied as any type of devices configured for short-term or long-term storage of data such as, for example, memory devices and circuits, memory cards, hard disk drives, solid-state drives, or other data storage devices. Each data storage device 234 may include a system partition that stores data and firmware code for the data storage device 234. Each data storage device 234 may also include one or more operating system partitions that store data files and executables for operating systems. Together, the communication circuitry 220, the accelerator devices 224, and the data storage devices 234 define a set of execution assistance devices 160 of the compute device 130.

Each of the one or more heat transfer devices 236 may be embodied as any device or circuitry capable of controlling a temperature within the compute device 130. As such, and as indicated in FIG. 2, the heat transfer devices 236 may include one or more fans 238 and/or one or more pumps 240 (e.g., for pumping a liquid coolant, such as water, through the compute device 130 to transfer heat away from one or more components).

The compute device 132, the management server 120, and the client device 170 may have components similar to those described in FIG. 2 with reference to the compute device 130. The description of those components of the compute device 130 is equally applicable to the description of components of the compute device 132, the management server 120, and the client device 170 and is not repeated herein for clarity of the description. Further, it should be appreciated that any of the compute devices 130, 132, the management server 120, and the client device 170 may include other components, sub-components, and devices commonly found in a computing device, which are not discussed above in reference to the compute device 130 and not discussed herein for clarity of the description.

As described above, the compute devices 130, 132, the management server 120, and the client device 170 are illustratively in communication via the network 180, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
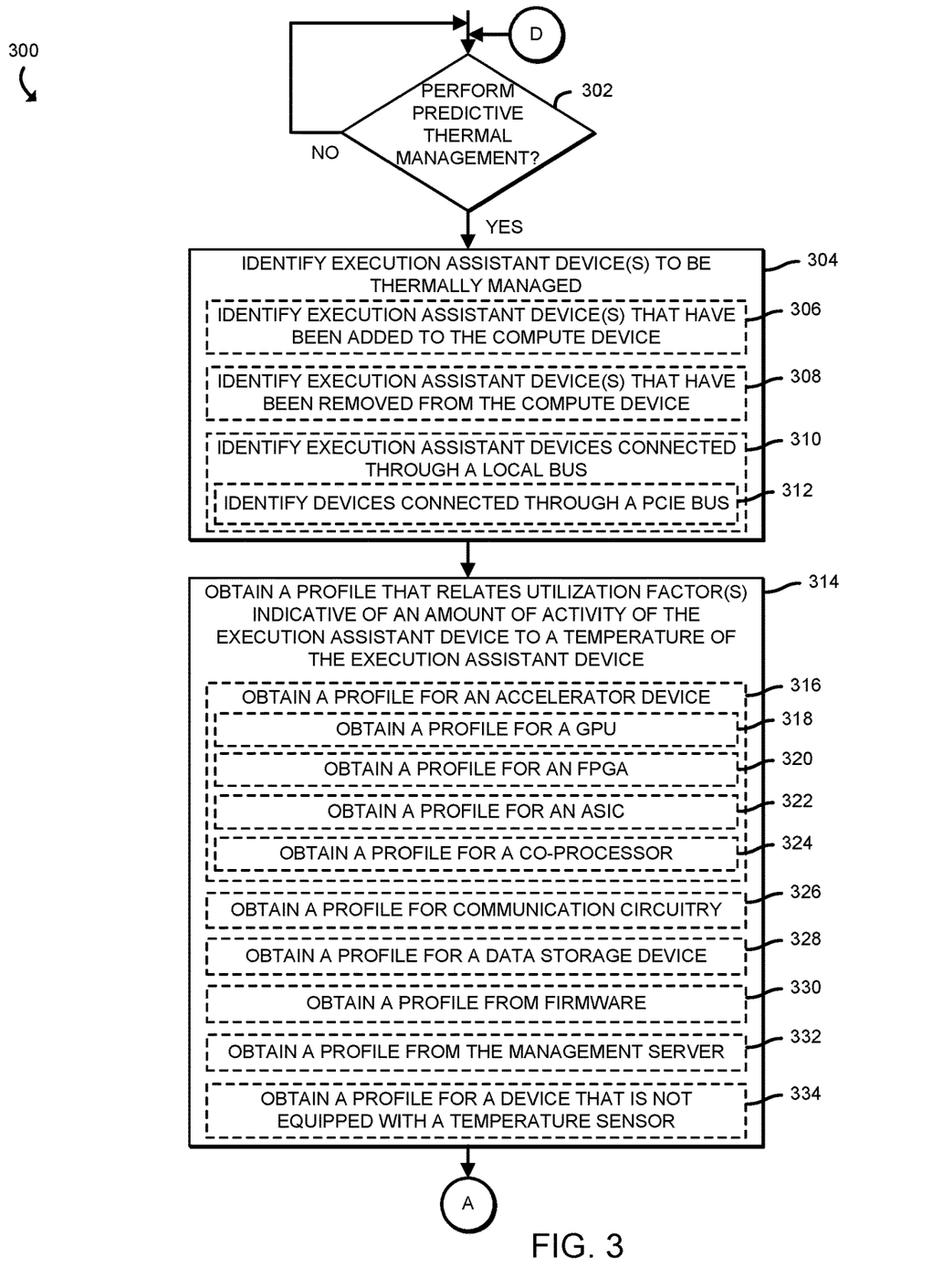
FIGS. 3-6 are a simplified block diagram of at least one embodiment of a method for providing predictive thermal management that may be performed by the compute device of FIGS. 1-2.

Referring now to FIG. 3, the compute device 130, in operation, may execute a method 300 providing predictive thermal management. The method 300 begins with block 302, in which the compute device 130 determines whether to perform predictive thermal management. In doing so, the compute device 130 may determine to perform predictive thermal management in response to a request to do so (e.g., a request form the management server 120), in response to determining that a configuration setting indicates to enable predictive thermal management, and/or based on other factors. Regardless, in response to a determination to perform predictive thermal management, the method 300 advances to block 304 in which the compute device 130 identifies execution assistant devices 160 to be thermally managed. In doing so, the compute device 130 may identify one or more execution assistant devices 160 that have been added to the compute device 130 (e.g., since a previous iteration of the method 300), as indicated in block 306. Similarly, the compute device 130 may identify one or more execution assistant devices 160 that have been removed from the compute device 130 (e.g., since a previous iteration of the method 300), as indicated in block 308. For example, the compute device 130 may read a memory region containing identifiers and types of the execution assistant devices 160 presently connected to the compute device 130. As indicated in block 310, the compute device 130, in the illustrative embodiment, identifies execution assistant devices 160 that are connected to the compute device 130 through a local bus. For example, and as indicated in block 312, the compute device 130 may identify execution assistant devices 160 that are connected to a PCIe bus (e.g., through the I/O subsystem 218).

Subsequently, in block 314, the compute device 130 obtains a profile for each identified execution assistant device 160 (e.g., from block 304). The profile relates one or more utilization factors indicative of an amount of activity of the execution assistant device 160 (e.g., the execution assistant device 160 associated with the obtained profile) to a temperature of the execution assistant device 160. In the illustrative embodiment, as each execution assistant device 160 may specialize in performing a different set of operations and have a different architecture than another execution assistant device 160, each execution assistant device 160 may exhibit different thermal characteristics (e.g., producing a different amount of heat for a given value of a utilization factor). As such, each profile may define a different relationship between a given utilization factor and the resulting temperature of the corresponding execution assistant device 160. As indicated in block 316, the compute device 130 may obtain a profile for an accelerator device 224. In doing so, the compute device 130 may obtain a profile for a GPU 226, as indicated in block 318, a profile for an FPGA 230, as indicated in block 320, a profile for an ASIC 228, as indicated in block 322, and/or a profile for a co-processor or other accelerator device 232, as indicated in block 324. Additionally or alternatively, the compute device 130 may obtain a profile for communication circuitry 220, such as the NIC 222, as indicated in block 326. The compute device 130 may also obtain a profile for a data storage device 234, as indicated in block 328. In some embodiments, the compute device 130 may obtain (e.g., read) the profile from a firmware of the corresponding execution assistant device 160, as indicated in block 330. Alternatively, the compute device 130 may obtain one or more of the profiles from the management server 120 (e.g., in response to sending a request to the management server 120 with an identifier of the execution assistant device 160). In other embodiments, the compute device 130 may obtain the profiles from another source. As indicated in block 334, the compute device 130 obtains the one or more profiles for execution assistant devices 160 that are not equipped with temperature sensors configured to directly report the temperature of the corresponding execution assistant device 160 (e.g., to the compute engine 150). Subsequently, the method 300 advances to block 336 of FIG. 4 in which the compute device 130 determines one or more value(s) of utilization factor(s) of the identified execution assistant device(s) 160 as a workload 140 is executed by the compute device 130 (e.g., by the compute engine 150 and one or more of the execution assistant devices 160).

Figure 4:
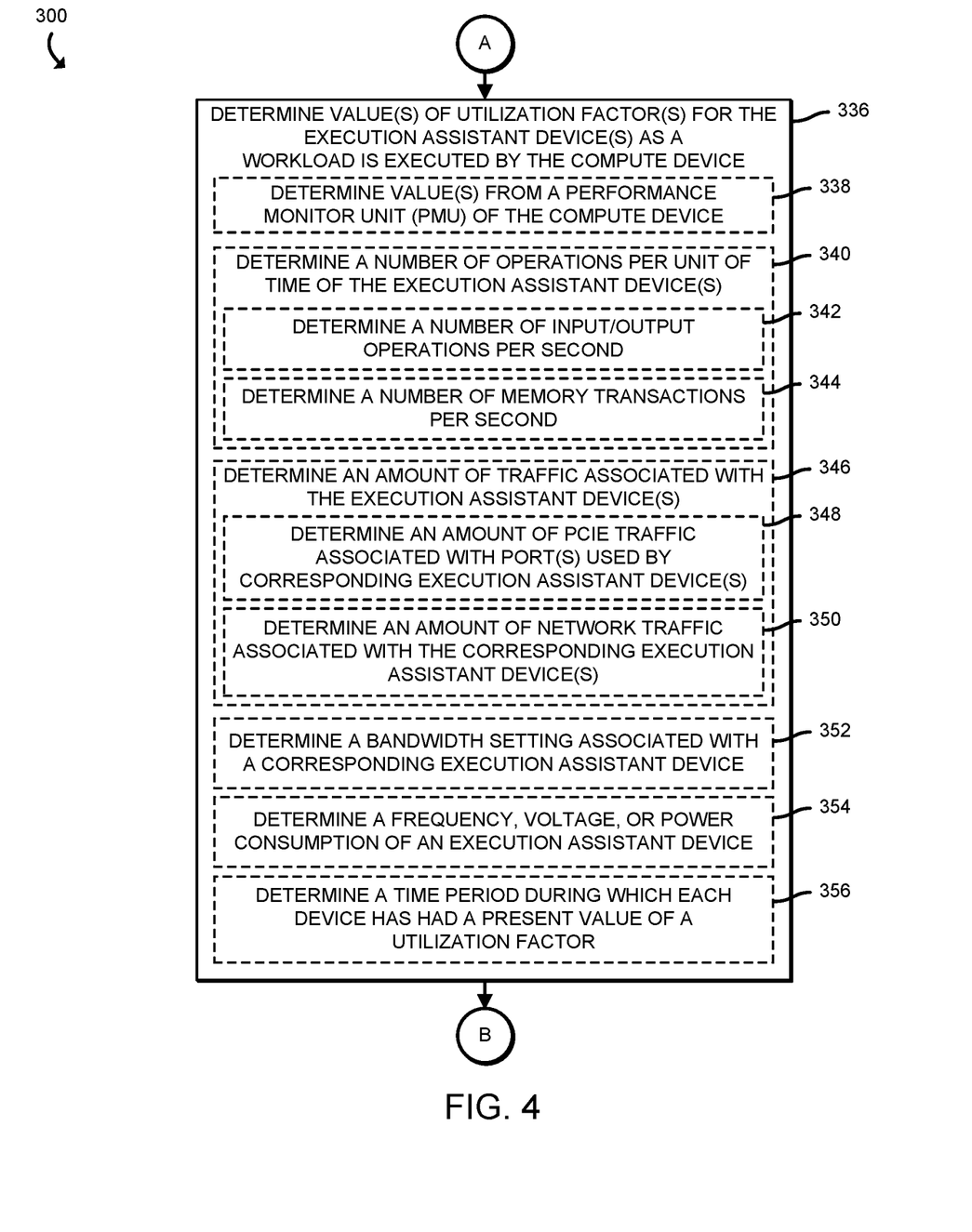

Referring now to FIG. 4, in determining the values of the utilization factors, the compute device 130 may determine the values from a performance monitor unit (e.g., the PMU 116) of the compute device 130, as indicated in block 338. As indicated in block 340, the compute device 130 may determine a number of operations performed by each execution assistant device 160 per unit of time (e.g., per second). In doing so, and as indicated in block 342, the compute device 130 may determine a number of input/output operations per second performed by one or more of the execution assistant devices 160. As indicated in block 344, the compute device 130 may determine a number of memory transactions (e.g., reads and/or writes to the memory 114) performed per second by one or more of the execution assistant devices 160. In block 346, the compute device 130 may determine an amount of traffic associated with each execution assistant device 160. For example, and as indicated in block 348, the compute device 130 may determine an amount of PCIe traffic associated with a port used by an execution assistant device 160. As indicated in block 350, the compute device 130 may determine an amount of network traffic (e.g., a number of packets per second) associated with an execution assistant device 160 (e.g., the NIC 222). The compute device 130, in some embodiments, may determine a bandwidth setting associated with a corresponding execution assistant device 160, as indicated in block 352. In some embodiments, the compute device 130 may determine a frequency, a voltage, or a power consumption of an execution assistant device 160, as indicated in block 354. As indicated in block 356, the compute device 130 may determine a time period during which each execution assistant device 160 has had a particular value (e.g., the present value) for a utilization factor. For example, an execution assistant device 160 may gradually heat up to a particular temperature after operating at a particular level of activity for a predefined time period, rather than immediately reaching the temperature. Subsequently, the method 300 advances to block 358 of FIG. 5, in which the compute device 130 determines one or more predicted temperatures (e.g., a temperature of each execution assistant device 160) as a function of the obtained profile(s) (e.g., from block 314) and the determined value(s) of the device utilization factor(s) (e.g., from block 336).

Figure 5:
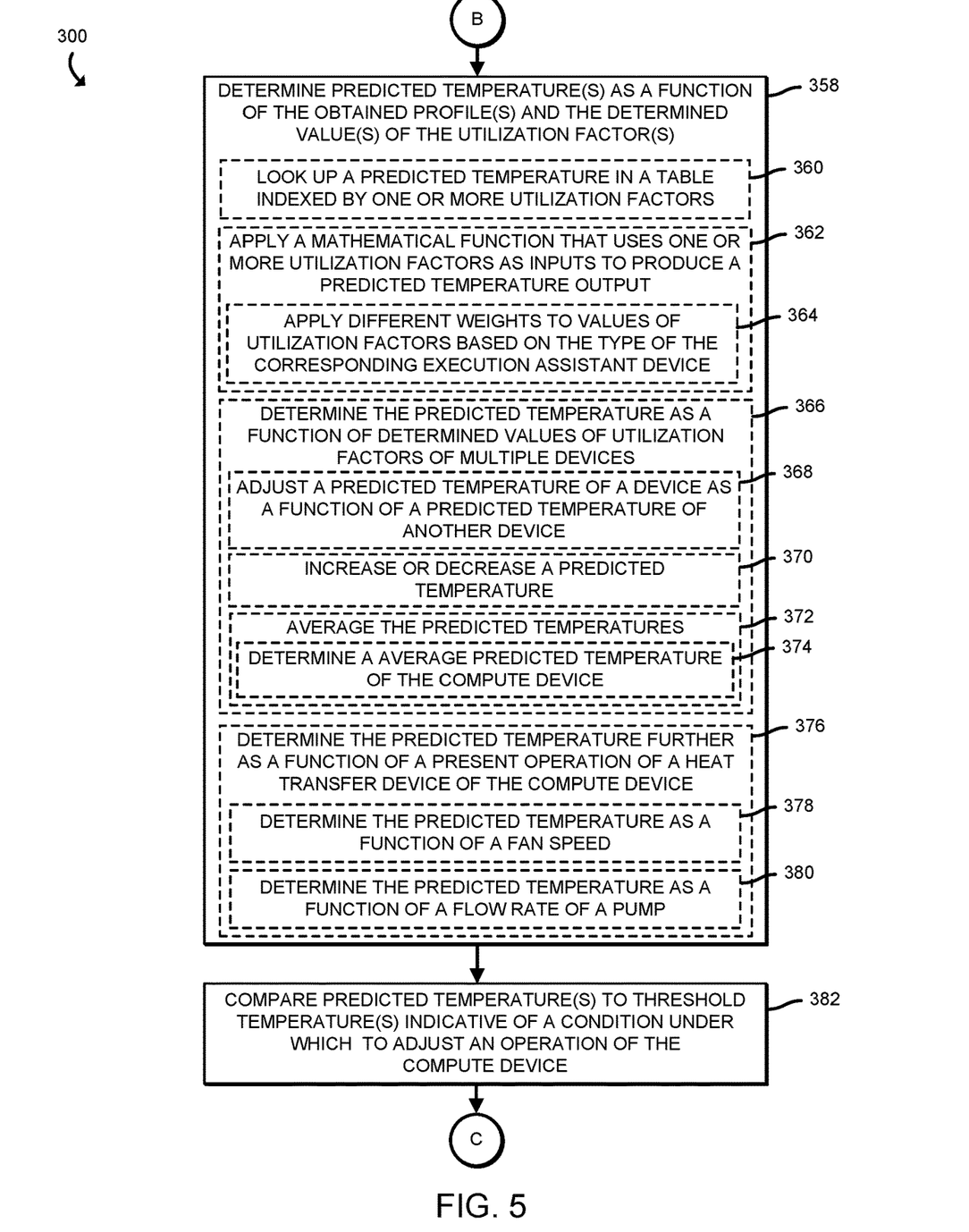

Referring now to FIG. 5, and as indicted in block 360, in determining a predicted temperature, the compute device 130 may look up a predicted temperature in a table (e.g., the profile defines a table) indexed by one or more utilization factors (e.g., a different predicted temperature is defined for each of multiple possible values of a utilization factor). As indicated in block 362, the compute device 130 may apply a mathematical function (e.g., a continuous function) that uses one or more utilization factors as inputs to produce a predicted temperature as the output. In the illustrative embodiment, and as indicated in block 364, the compute device 130 may apply a different set of weights to the values of the utilization factors used as inputs, based on the type of the corresponding execution assistant device 160 being analyzed (e.g., a profile associated with one execution assistant device 160 may define one set of weights and another profile associated with a different execution assistance device 160 may define a different set of weights, to output a different predicted temperature for the same input values). As indicated in block 366, the compute device 130 may determine the predicted temperature as a function of determined values of utilization factors of multiple devices (e.g., multiple execution assistant devices 160). For example, and as indicated in block 368, the compute device 130 may adjust a predicted temperature of an execution assistant device 160 as a function of a predicted temperature of another execution assistant device 160 (e.g., determined from values of utilization factors associated with that other execution assistant device 160), as heat produced from one execution assistant device 160 may increase the temperature of another execution assistant device 160 in the same compute device 130. As such, and as indicated in block 370, in adjusting the predicted temperature, the compute device 130 may selectively increase or decrease the predicted temperature. In some embodiments, the compute device 130 may average multiple predicted temperatures of different execution assistant devices 160, as indicated in block 372. Further, in doing so, the compute device 130 may determine an average predicted temperature of the whole compute device 130, as indicated in block 374.

As indicated in block 376, the compute device 130 may determine the predicted temperature further as a function of a present operation of a heat transfer device 236. In doing so, and as indicated in block 378, the compute device 130 may determine the predicted temperature as a function of a speed of one or more fans 238 (e.g., the fan speed may be inversely related to the predicted temperature). Additionally or alternatively, the compute device 130 may determine the predicted temperature as a function of a flow rate (e.g., a volumetric flow rate) of a pump 240 (e.g., a liquid coolant pump), as indicated in block 380. In such embodiments, the predicted temperature may be inversely related to the flow rate of the pump 240. Subsequently, in block 382, the compute device 130 compares the predicted temperature(s) to predefined threshold temperature(s) indicative of a condition under which to adjust an operation of the compute device 130 (e.g., a temperature at which the performance or longevity of one or more components would be adversely affected). Afterwards, in block 384 of FIG. 6, the compute device 130 determines the subsequent course of action based on whether any of the predicted temperature(s) satisfy the threshold temperature(s).

Figure 6:
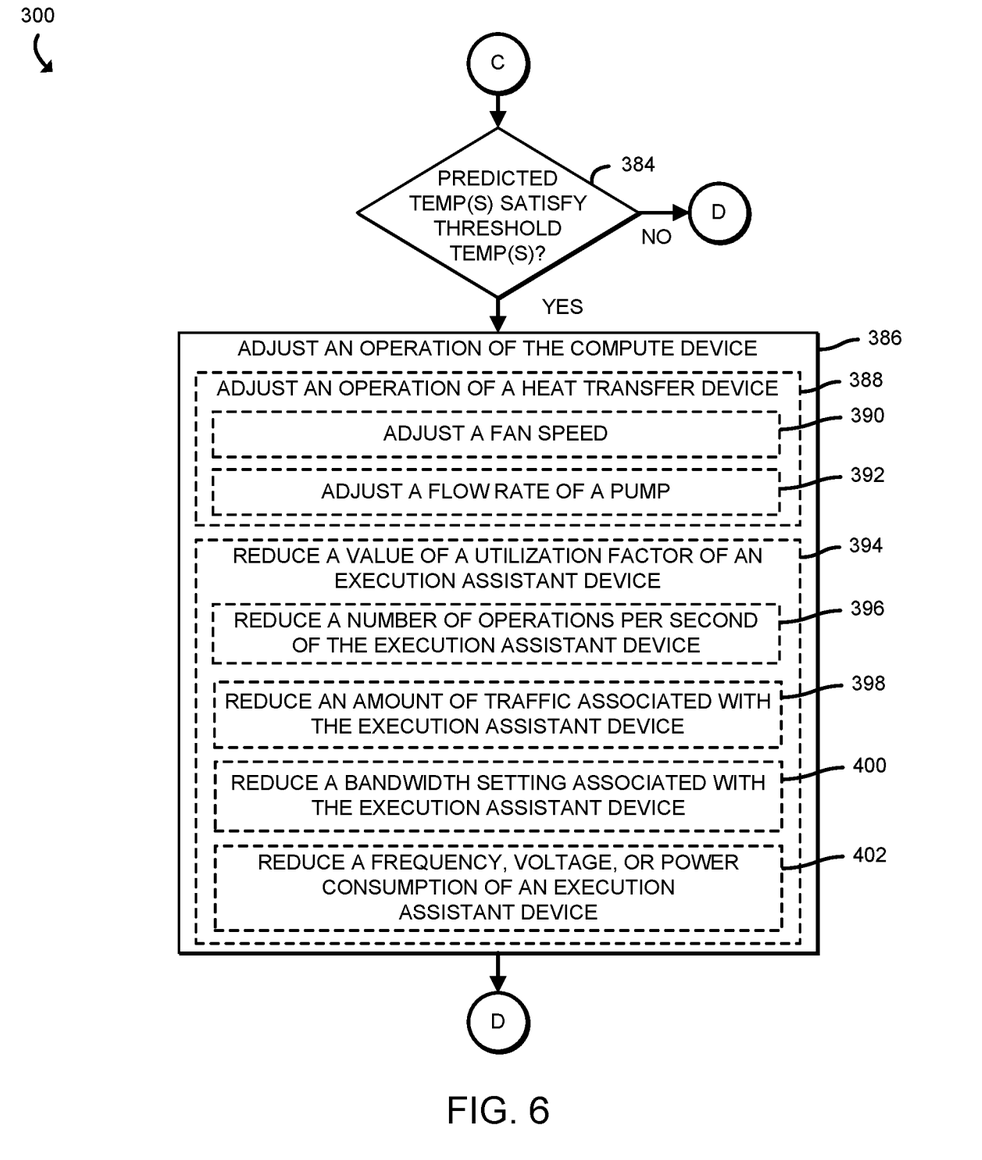

Referring now to FIG. 6, in response to a determination that no predicted temperature satisfies a corresponding threshold temperature (e.g., no component is too hot), the method 300 loops back to block 302, in which the compute device 130 determines whether to continue to perform predictive thermal management and identify any execution assistant devices that have been added or removed from the compute device 130. Otherwise, the method 300 advances to block 386 in which the compute device 130 adjusts an operation of the compute device (e.g., to reduce one or more predicted temperature(s)). In doing so, and as indicated in block 388, the compute device 130 may adjust an operation of a heat transfer device 236. For example, the compute device 130 may adjust a speed of a fan 238, as indicated in block 390 and/or adjust a flow rate of a pump 240, as indicated in block 392. As indicated in block 394, the compute device 130 may reduce a value of a utilization factor of an execution assistant device 160 (e.g., an execution assistant device having a predicted temperature that satisfies the predefined threshold temperature). The compute device 130 may adjust a value of a utilization factor by setting a value in a corresponding register (e.g., a machine specific register (MSR)), by sending a corresponding request (e.g., through a local bus) to the execution assistant device 160, and/or by another method. In reducing a value of a utilization factor, the compute device 130 may reduce a number of operations per second performed by the execution assistant device 160, as indicated in block 396. As indicated in block 398, the compute device 130 may reduce an amount of traffic (e.g., traffic through a local bus, such as a PCIe bus and/or network traffic, such as network packets) associated with (e.g., sent and/or received by) the execution assistant device 160. Similarly, as indicated in block 400, the compute device 130 may reduce a bandwidth setting associated with the execution assistant device 160 and/or reduce a frequency (e.g., clock frequency), a voltage, or power consumption of the execution assistant device 160, as indicated in block 402. Subsequently, the method 300 loops back to block 302, in which the compute device 130 determines whether to continue to perform predictive thermal management and, if so, identify any execution assistant devices 160 that have been added or removed from the compute device 130.

EXAMPLES

Illustrative examples of the technologies disclosed herein are provided below. An embodiment of the technologies may include any one or more, and any combination of, the examples described below.

Example 1 includes a compute device comprising a compute engine; an execution assistant device configured to assist the compute engine in the execution of a workload; wherein the compute engine is configured to obtain a profile that relates a utilization factor indicative of a present amount of activity of the execution assistant device to a predicted temperature of the execution assistant device; determine, as the execution assistant device assists in the execution of the workload, a value of the utilization factor of the execution assistant device; determine, as a function of the determined value of the utilization factor and the obtained profile, the predicted temperature of the execution assistant device; determine whether the predicted temperature satisfies a predefined threshold temperature; and adjust, in response to a determination that the predicted temperature satisfies the predefined threshold temperature, an operation of the compute device to reduce the predicted temperature.

Example 2 includes the subject matter of Example 1, and wherein the compute engine is further configured to determine a number of memory transactions performed by the execution assistant device over a predefined time period.

Example 3 includes the subject matter of any of Examples 1 and 2, and wherein the compute engine is further configured to determine whether an execution assistant device has been connected to the compute device through a local bus and obtain, in response to a determination that the execution assistant device has been connected to the compute device through a local bus, the profile.

Example 4 includes the subject matter of any of Examples 1-3, and wherein the compute engine is further configured to obtain a profile for an execution assistant device that is not equipped with a temperature sensor.

Example 5 includes the subject matter of any of Examples 1-4, and wherein the compute engine is further configured to obtain a profile for at least one of an accelerator device, communication circuitry, or a data storage device.

Example 6 includes the subject matter of any of Examples 1-5, and wherein the compute engine is further configured to obtain the profile from a firmware of the execution assistant device.

Example 7 includes the subject matter of any of Examples 1-6, and further including a performance monitor unit and wherein the compute engine is further configured to determine the value of the utilization factor with the performance monitor unit.

Example 8 includes the subject matter of any of Examples 1-7, and wherein the compute engine is further configured to determine at least one of a number of operations performed per unit of time by the execution assistant device, an amount of traffic associated with the execution assistant device, a bandwidth setting associated with the execution assistant device, a frequency associated with the execution assistant device, a voltage associated with the execution assistant device, or a power consumption associated with the execution assistant device.

Example 9 includes the subject matter of any of Examples 1-8, and wherein the compute engine is further configured to determine a time period during which the execution assistant device has had the present value of the utilization factor.

Example 10 includes the subject matter of any of Examples 1-9, and wherein the compute engine is further configured to look up the predicted temperature in a table of predicted temperatures that is indexed by values of the utilization factor.

Example 11 includes the subject matter of any of Examples 1-10, and wherein the compute engine is further configured to apply a weight defined in the profile to the value of the utilization factor to determine the predicted temperature.

Example 12 includes the subject matter of any of Examples 1-11, and wherein the predicted temperature is a first predicted temperature, the execution assistant device is a first execution assistant device, the compute device comprises a second execution assistant device, and wherein the compute engine is further configured to adjust the first predicted temperature as a function of a second predicted temperature of the second execution assistant device.

Example 13 includes the subject matter of any of Examples 1-12, and wherein the compute engine is further configured to determine an average temperature of the compute device.

Example 14 includes the subject matter of any of Examples 1-13, and wherein the compute engine is further configured to determine the predicted temperature as a function of a present operation of a heat transfer device of the compute device.

Example 15 includes the subject matter of any of Examples 1-14, and wherein the compute engine is further configured to adjust an operation of a heat transfer device of the compute device or reduce the value of the utilization factor of the execution assistant device to reduce the predicted temperature.

Example 16 includes one or more machine-readable storage media comprising a plurality of instructions stored thereon that, in response to being executed, cause a compute device to obtain a profile that relates a utilization factor indicative of a present amount of activity of an execution assistant device to a predicted temperature of the execution assistant device; determine, as the execution assistant device assists in the execution of a workload, a value of the utilization factor of the execution assistant device; determine, as a function of the determined value of the utilization factor and the obtained profile, the predicted temperature of the execution assistant device; determine whether the predicted temperature satisfies a predefined threshold temperature; and adjust, in response to a determination that the predicted temperature satisfies the predefined threshold temperature, an operation of the compute device to reduce the predicted temperature.

Example 17 includes the subject matter of Example 16, and wherein the plurality of instructions further cause the compute device to determine a number of memory transactions performed by the execution assistant device over a predefined time period to determine the value of the utilization factor.

Example 18 includes the subject matter of any of Examples 16 and 17, and wherein the plurality of instructions further cause the compute device to determine whether an execution assistant device has been connected to the compute device through a local bus and obtain, in response to a determination that the execution assistant device has been connected to the compute device through a local bus, the profile.

Example 19 includes the subject matter of any of Examples 16-18, and wherein the plurality of instructions further cause the compute device to obtain a profile for an execution assistant device that is not equipped with a temperature sensor.

Example 20 includes the subject matter of any of Examples 16-19, and wherein the plurality of instructions further cause the compute device to obtain a profile for at least one of an accelerator device, communication circuitry, or a data storage device.

Example 21 includes the subject matter of any of Examples 16-20, and wherein the plurality of instructions further cause the compute device to obtain the profile from a firmware of the execution assistant device.

Example 22 includes the subject matter of any of Examples 16-21, and wherein the plurality of instructions further cause the compute device to determine the value of the utilization factor with a performance monitor unit.

Example 23 includes the subject matter of any of Examples 16-22, and wherein the plurality of instructions further cause the compute device to determine at least one of a number of operations performed per unit of time by the execution assistant device, an amount of traffic associated with the execution assistant device, a bandwidth setting associated with the execution assistant device, a frequency associated with the execution assistant device, a voltage associated with the execution assistant device, or a power consumption associated with the execution assistant device.

Example 24 includes the subject matter of any of Examples 16-23, and wherein the plurality of instructions further cause the compute device to determine a time period during which the execution assistant device has had the present value of the utilization factor.

Example 25 includes the subject matter of any of Examples 16-24, and wherein the plurality of instructions further cause the compute device to look up the predicted temperature in a table of predicted temperatures that is indexed by values of the utilization factor.

Example 26 includes a compute device comprising circuitry for obtaining a profile that relates a utilization factor indicative of a present amount of activity of an execution assistant device to a predicted temperature of the execution assistant device; circuitry for determining, as the execution assistant device assists in the execution of a workload, a value of the utilization factor of the execution assistant device; means for determining, as a function of the determined value of the utilization factor and the obtained profile, the predicted temperature of the execution assistant device; circuitry for determining whether the predicted temperature satisfies a predefined threshold temperature; and circuitry for adjusting, in response to a determination that the predicted temperature satisfies the predefined threshold temperature, an operation of the compute device to reduce the predicted temperature.

Example 27 includes a method comprising obtaining, by a compute device, a profile that relates a utilization factor indicative of a present amount of activity of an execution assistant device to a predicted temperature of the execution assistant device; determining, by the compute device and as the execution assistant device assists in the execution of a workload, a value of the utilization factor of the execution assistant device; determining, by the compute device and as a function of the determined value of the utilization factor and the obtained profile, the predicted temperature of the execution assistant device; determining, by the compute device, whether the predicted temperature satisfies a predefined threshold temperature; and adjusting, by the compute device and in response to a determination that the predicted temperature satisfies the predefined threshold temperature, an operation of the compute device to reduce the predicted temperature.

The invention claimed is:

1. An apparatus comprising:
   memory;
   instructions; and
   programmable circuitry to execute the instructions to:
     detect utilization of devices, wherein the devices are to perform at least one workload; and
     adjust the utilization of the devices based at least on temperatures of the devices, wherein the devices include at least two different types of devices, the different types of devices including: (i) a graphics processing unit (GPU), (ii) a central processing unit (CPU), (iii) an accelerator, (iv) an application specific integrated circuit (ASIC), (v) communication circuitry or (vi) a data storage device.

2. The apparatus of claim 1, wherein the temperatures of the devices include predicted temperatures of the devices based on activity of the devices.

3. The apparatus of claim 1, wherein the utilization of the devices corresponds to an amount of activity of the devices.

4. The apparatus of claim 1, wherein the utilization of the devices corresponds to at least one of: a number of operations performed per unit of time by the devices, an amount of traffic associated with the devices, a bandwidth setting associated with the devices, a frequency of operations associated with the devices, a voltage of operation of the devices, or a power consumption of the devices.

5. The apparatus of claim 1, wherein the programmable circuitry is to adjust the utilization of the devices by adjusting an activity level and heat production of the devices.

6. The apparatus of claim 1, wherein the programmable circuitry is to adjust the utilization of the devices based on heat removal capabilities of the devices.

7. The apparatus of claim 1, wherein the programmable circuitry is to adjust the utilization of the devices by adjusting predicted temperatures of the devices.

8. A method comprising:
   detecting, by executing instructions with at least one processor, utilization of devices, wherein the devices are to perform at least one workload; and
   adjusting, by executing instructions with the at least one processor, the utilization of ones of the devices based at least on temperatures of ones of the devices, wherein the devices include at least two different types of devices, the different types of devices including: (i) a graphics processing unit (GPU), (ii) a central processing unit (CPU), (iii) an accelerator, (iv) an application specific integrated circuit (ASIC), (v) communication circuitry or (vi) a data storage device.

9. The method of claim 8, wherein the temperatures of the devices includes predicted temperatures of the devices based on activity of the devices.

10. The method of claim 8, wherein the utilization of devices corresponds to an amount of activity of the devices.

11. The method of claim 8, wherein the utilization of devices corresponds to at least one of: a number of operations performed per unit of time by the devices, an amount of traffic associated with the devices, a bandwidth setting associated with the devices, a frequency of operation associated with the devices, a voltage of operation of the devices, or a power consumption of the devices.

12. The method of claim 8, wherein the adjusting the utilization of the devices includes adjusting an activity level and heat production of the devices.

13. The method of claim 8, wherein the adjusting the utilization of the devices is based on heat removal capabilities of the devices.

14. The method of claim 8, wherein the adjusting the utilization of the devices includes adjusting predicted temperatures of the devices.

15. A non-transitory computer-readable medium comprising instructions stored thereon, that when executed by one or more processing resources, cause the one or more processing resources to:
   determine utilization of devices, wherein the devices are to perform at least one workload; and
   adjust utilization of the devices based at least on temperatures of the devices, wherein the devices include at least two different types of devices, the different types of devices including: (i) a graphics processing unit (GPU), (ii) a central processing unit (CPU), (iii) an accelerator, (iv) an application specific integrated circuit (ASIC), (v) communication circuitry or (vi) a data storage device.

16. The non-transitory computer-readable medium of claim 15, wherein the temperatures of the devices includes predicted temperatures of the devices corresponding to activity of the devices.

17. The non-transitory computer-readable medium of claim 15, wherein the utilization of the devices corresponds to an amount of activity of the devices.

18. The non-transitory computer-readable medium of claim 15, wherein the utilization of devices corresponds to at least one of: a number of operations performed per unit of time by the devices, an amount of traffic associated with the devices, a bandwidth setting associated with the devices, a frequency of operation associated with the devices, a voltage of operation of the devices, or a power consumption of the devices.

19. The non-transitory computer-readable medium of claim 15, wherein the adjustment of the utilization of the devices includes adjustment of an activity level and heat production of the devices.

20. The non-transitory computer-readable medium of claim 15, wherein the adjustment of the utilization of the devices is based on heat removal capabilities of the devices.

21. The apparatus of claim 1, wherein the programmable circuitry is to predict the temperatures of the devices based on the utilization of the devices.

22. The apparatus of claim 21, wherein the programmable circuitry is to calculate the utilization based on at least one of a number of operations or a number of transactions corresponding to ones of the devices.

\* \* \* \* \*